(12) United States Patent
Kawata

(10) Patent No.: US 10,268,092 B2
(45) Date of Patent: Apr. 23, 2019

(54) DISPLAY DEVICE

(71) Applicant: Japan Display Inc., Minato-ku (JP)

(72) Inventor: Yasushi Kawata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/636,805

(22) Filed: Jun. 29, 2017

(65) Prior Publication Data

US 2018/0004053 A1    Jan. 4, 2018

(30) Foreign Application Priority Data

Jul. 4, 2016    (JP) .................................. 2016-132687

(51) Int. Cl.
*G02F 1/1362* (2006.01)
*G02F 1/1333* (2006.01)
*G02F 1/153* (2006.01)

(52) U.S. Cl.
CPC .. *G02F 1/136227* (2013.01); *G02F 1/133305* (2013.01); *G02F 1/136286* (2013.01); *G02F 1/133345* (2013.01); *G02F 2001/1536* (2013.01)

(58) Field of Classification Search
CPC ........... H01L 21/67132; H01L 23/4985; H01L 24/06; H01L 27/124; H01L 27/1259; H01L 27/3272; H01L 27/3276; H01L 2224/73265; H01L 2224/83851; H01L 2924/00; H05K 1/028; H05K 1/0281; G02F 1/133305; G02F 1/133345; G02F 2001/133334; G02F 2202/28; G06F 1/1652; G09G 2330/06
See application file for complete search history.

(56) References Cited

U.S. PATENT DOCUMENTS

| | | | | | |
|---|---|---|---|---|---|
| 5,834,327 | A | * | 11/1998 | Yamazaki | ........... H01L 21/6835 438/30 |
| 6,262,702 | B1 | * | 7/2001 | Murade | ................. G02F 1/1345 345/100 |
| 2003/0016328 | A1 | * | 1/2003 | Chung | ............. G02F 1/133512 349/149 |
| 2005/0212985 | A1 | * | 9/2005 | Kawasaki | ......... G02F 1/136286 349/42 |
| 2006/0007382 | A1 | * | 1/2006 | Sano | .................... G02F 1/13452 349/150 |
| 2007/0065957 | A1 | * | 3/2007 | Fujii | ....................... H01L 27/12 438/16 |
| 2007/0242178 | A1 | * | 10/2007 | Kawasaki | ............ G02F 1/1362 349/43 |

(Continued)

FOREIGN PATENT DOCUMENTS

JP    2014-232300    12/2014
JP    2015-148728    8/2015

*Primary Examiner* — Michael J Eurice
(74) *Attorney, Agent, or Firm* — Oblon, McClelland, Maier & Neustadt, L.L.P.

(57) ABSTRACT

According to one embodiment, a display device includes a display panel including a first area and a second area adjacent to the first area, and a wiring substrate mounted on the second area of the display panel, wherein the first area includes an insulating substrate, an inorganic insulating film disposed on the insulating substrate, and a signal line disposed on the inorganic insulating film, and the second area includes a protective layer and the signal line disposed continuously from the first area on the protective layer.

13 Claims, 9 Drawing Sheets

(56) References Cited

U.S. PATENT DOCUMENTS

| | | | |
|---|---|---|---|
| 2008/0265785 A1* | 10/2008 | Kim | G09G 3/3225 |
| | | | 315/169.3 |
| 2009/0224245 A1* | 9/2009 | Umezaki | G11C 19/28 |
| | | | 257/59 |
| 2012/0327328 A1* | 12/2012 | Kim | G02F 1/133308 |
| | | | 349/59 |
| 2014/0014960 A1* | 1/2014 | Yamazaki | G06F 3/0412 |
| | | | 257/59 |
| 2014/0353670 A1* | 12/2014 | Youn | H01L 27/124 |
| | | | 257/72 |
| 2015/0022561 A1* | 1/2015 | Ikeda | G06F 1/1652 |
| | | | 345/690 |
| 2015/0221683 A1* | 8/2015 | Odaka | H01L 27/1262 |
| | | | 257/72 |
| 2015/0282304 A1* | 10/2015 | Ely | H05K 1/0281 |
| | | | 361/750 |
| 2015/0287750 A1 | 10/2015 | Youn et al. | |
| 2015/0367622 A1* | 12/2015 | Adachi | B32B 37/025 |
| | | | 156/759 |
| 2016/0041428 A1* | 2/2016 | Hirakata | G02F 1/1334 |
| | | | 345/212 |
| 2016/0181282 A1 | 6/2016 | Odaka et al. | |
| 2016/0347047 A1* | 12/2016 | Eguchi | B32B 43/006 |
| 2017/0013722 A1* | 1/2017 | Kim | H01L 24/27 |
| 2017/0110529 A1* | 4/2017 | Zhang | H01L 27/3276 |
| 2017/0271423 A1* | 9/2017 | Murai | H01L 27/3262 |
| 2017/0317151 A1* | 11/2017 | Miyake | H01L 51/502 |
| 2018/0031927 A1* | 2/2018 | Ikeda | G02F 1/133345 |
| 2018/0145096 A1* | 5/2018 | Yamazaki | H01L 27/1255 |

* cited by examiner

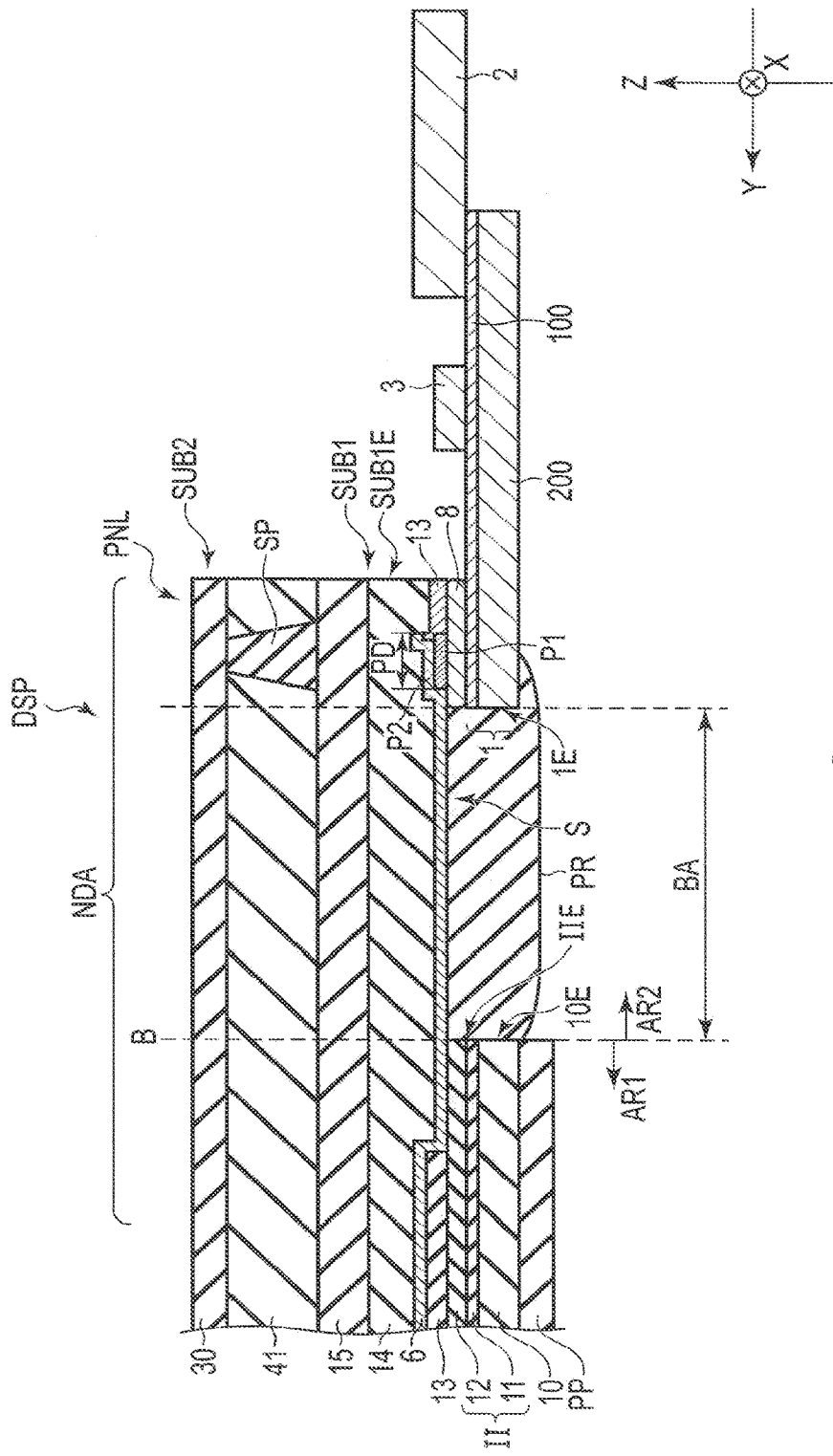
F I G. 3

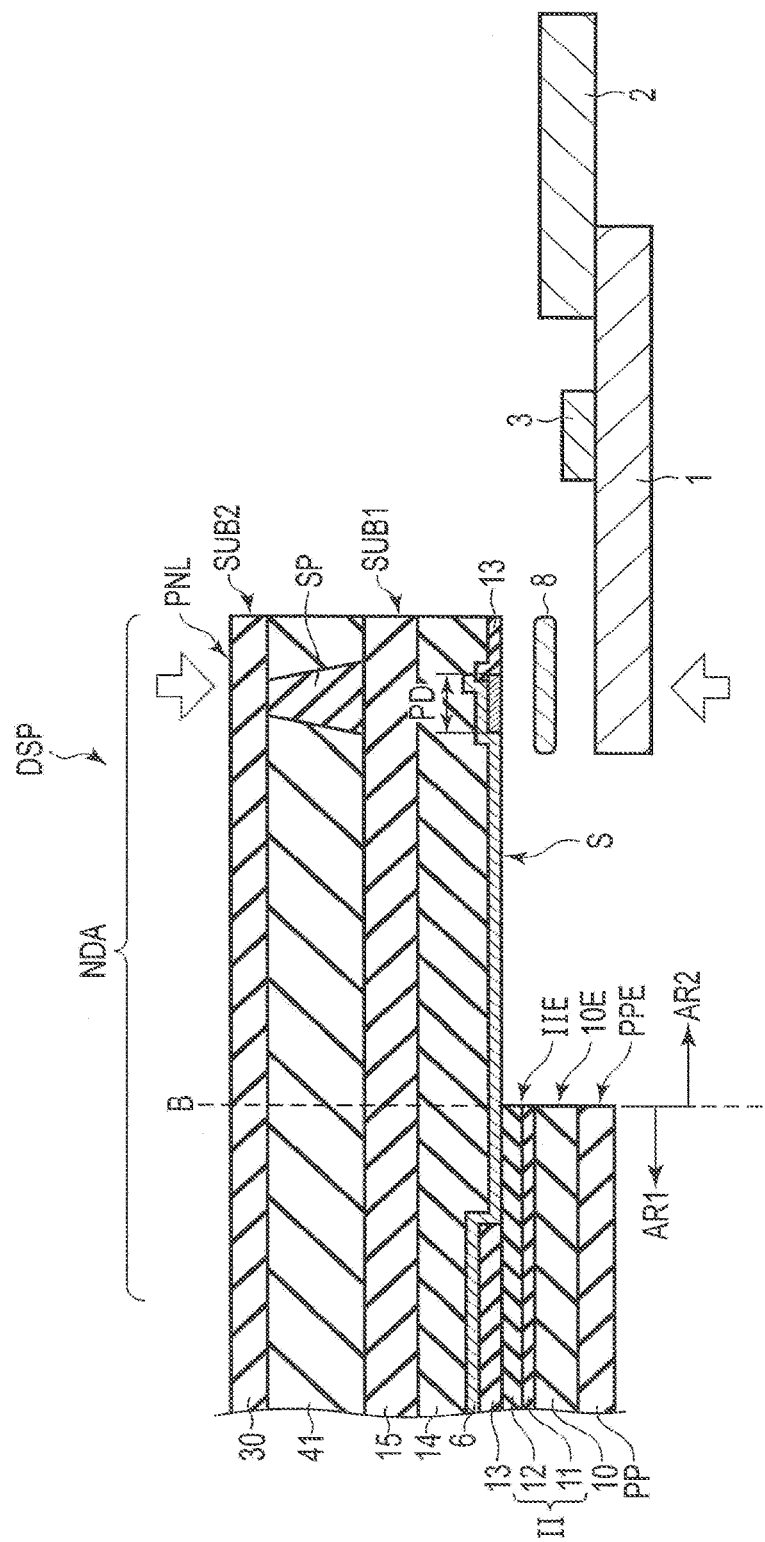
F I G. 8

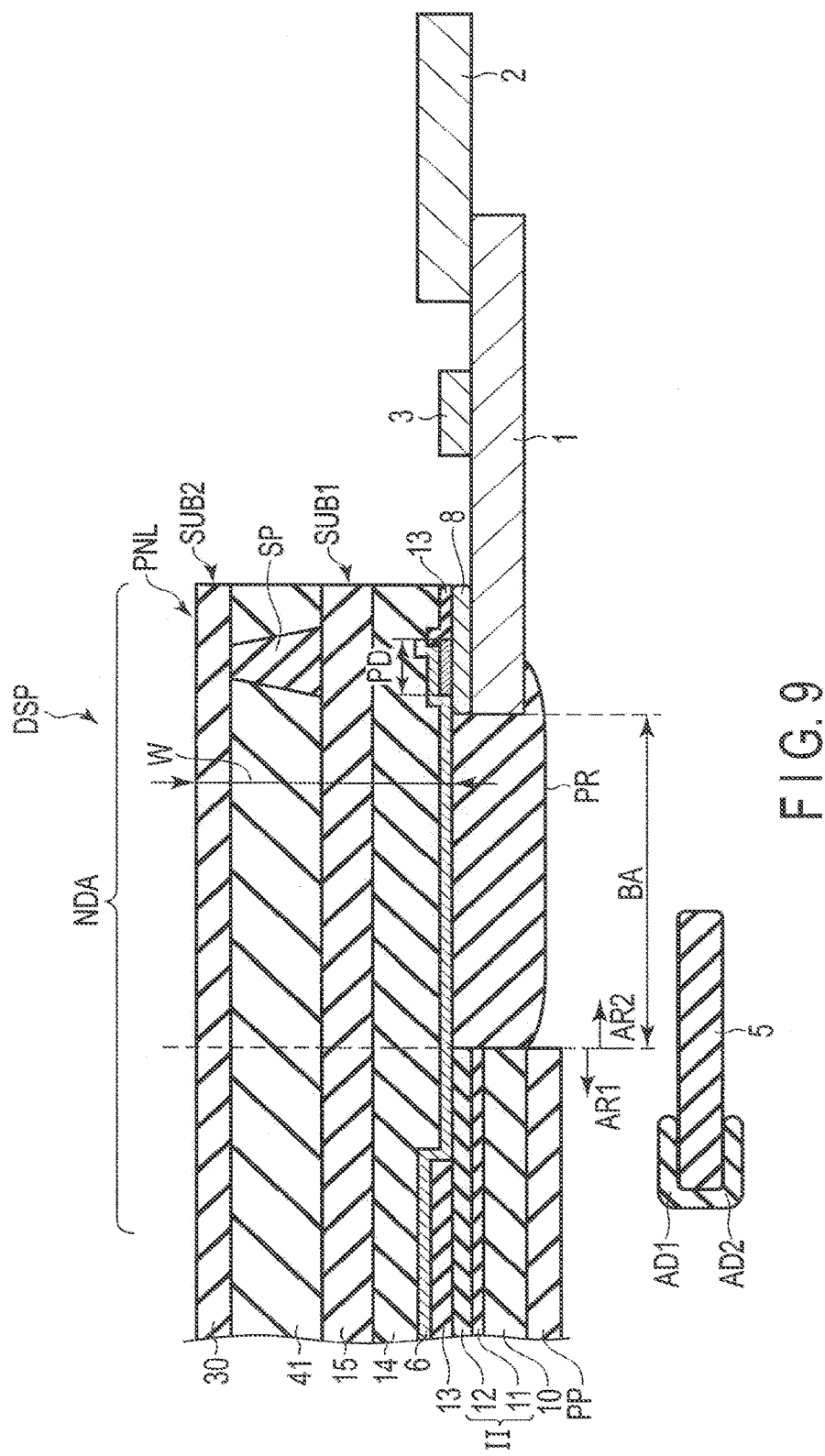
F I G. 9

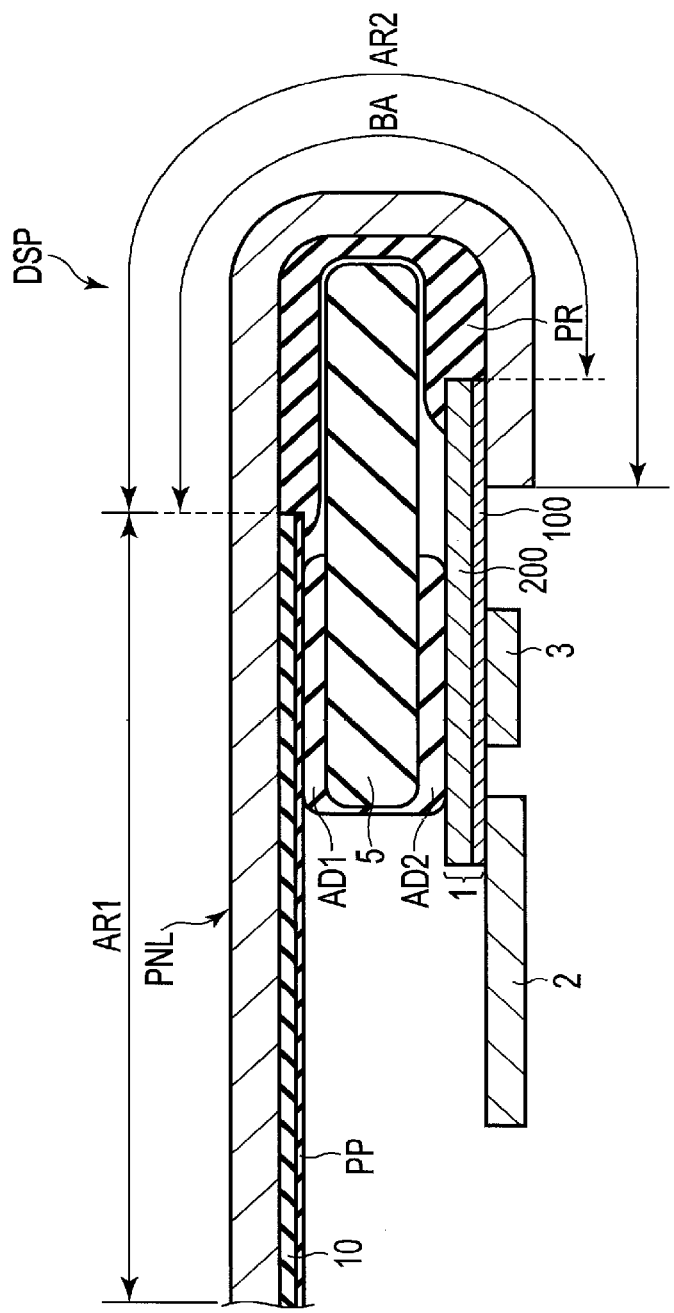
F I G. 10

DISPLAY DEVICE

CROSS-REFERENCE TO RELATED APPLICATIONS

This application is based upon and claims the benefit of priority from Japanese Patent Application No. 2016-132687, filed Jul. 4, 2016, the entire contents of which are incorporated herein by reference.

FIELD

Embodiments described herein relate generally to a display device.

BACKGROUND

Recently, requirements to further narrow display devices have been increased in the technical field of display devices such as liquid crystal display devices and organic electroluminescent (EL) display devices. In addition, flexible display devices capable of bending by being formed of substrates having flexibility have been developed.

Such a display device comprises a pad connected to external circuits and the like in a non-display area around a display area and supplied with a voltage, conductive lines connected to the pad, and the like to supply the voltage to pixels. To narrow the display device, the display device is accommodated in an electronic device and the like with the substrate bent such that a pad is disposed on a back surface of the substrate. A technology of forming a hole penetrating at least one of insulating films under the conductive lines in order to suppress break of the conductive lines in the bent area has been well known.

BRIEF DESCRIPTION OF THE DRAWINGS

FIG. 3 is a cross-sectional view showing the display device shown in FIG. 1 including a non-display area.

FIG. 4 is a plan view showing a display panel according to the embodiments, illustrating a positional relationship between a first area and a second area, and the like.

FIG. 8 is a cross-sectional view for explanation of a process of crimping a wiring board on the display panel.

FIG. 9 is a cross-sectional view for explanation of a process of bending a bend portion of the display panel.

FIG. 10 is a cross-sectional view showing a bent state of the bend portion of the display panel shown in FIG. 9.

DETAILED DESCRIPTION

Figure 1:
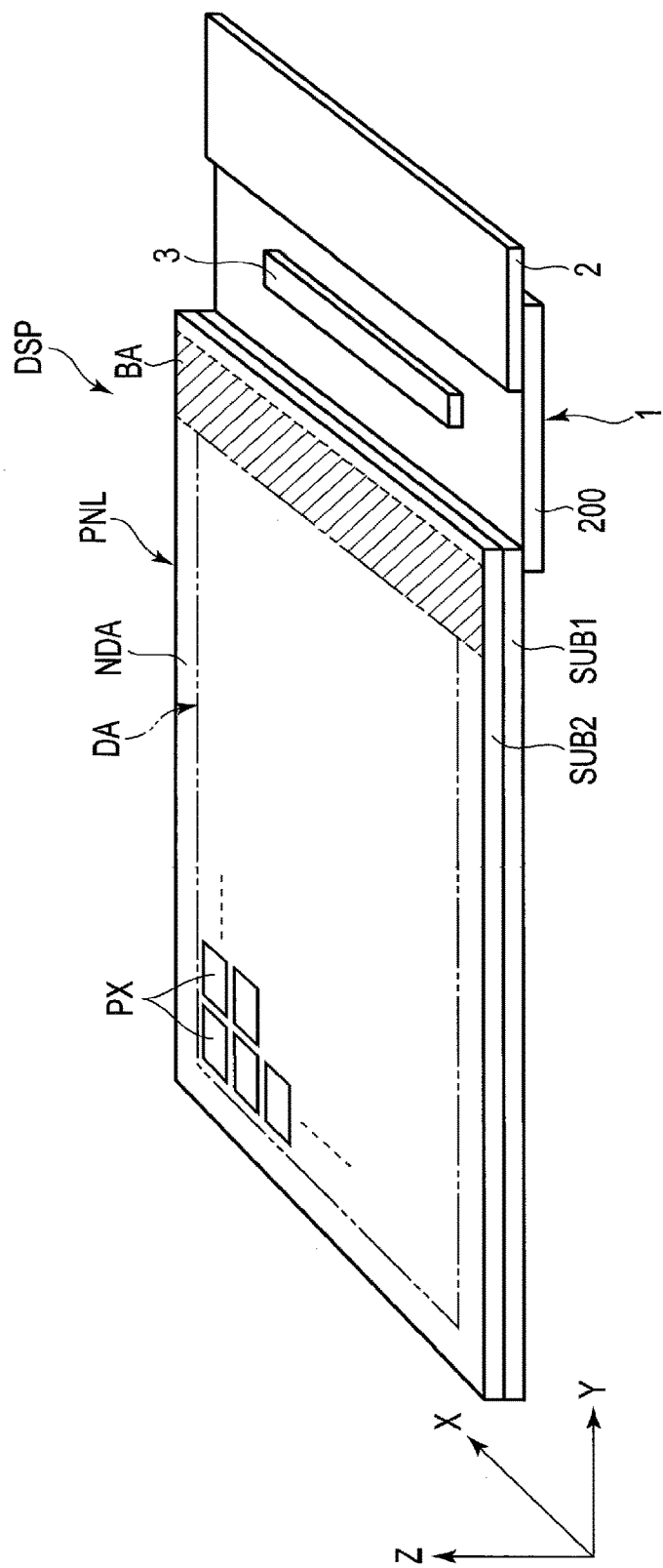
FIG. 1 is a perspective view showing a configuration of a display device according to the embodiments.

In general, according to one embodiment, a display device comprising: a display panel including a first area and a second area adjacent to the first area; and a wiring substrate mounted on the second area of the display panel, wherein the first area includes an insulating substrate, an inorganic insulating film disposed on the insulating substrate, and a signal line disposed on the inorganic insulating film, and the second area includes a protective layer and the signal line disposed continuously from the first area on the protective layer.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First, a display device according to the embodiments will be described in detail. FIG. 1 is a perspective view schematically showing a configuration of a display device DSP according to the embodiments. FIG. 1 shows a three-dimensional space defined by a first direction X, a second direction Y orthogonal to the first direction X, and a third direction Z orthogonal to the first direction X and the second direction Y. The first direction X and the second direction Y are orthogonal to each other but may intersect at an angle other than ninety degrees. In the embodiments, the display device is assumed to be an organic electroluminescent (EL) display device.

As shown in FIG. 1, the display device DSP comprises a display panel PNL, a wiring substrate 1, and a flexible printed circuit 2. The display panel PNL includes a first substrate SUB1 shaped in a flat plate, and a second substrate SUB2 shaped in a flat plate and disposed to the first substrate SUB1.

In the embodiments, a direction facing a tip side of an arrow indicating the third direction Z, is called an upward direction, and a direction facing a side opposite to the tip of the arrow is called a downward direction. According to "a second member above a first member" and "a second member below a first member", the second member may be in contact with the first member or may be placed at a position remote from the first member. In the latter case, a third member may be interposed between the first member and the second member.

The display panel PNL includes a display area DA on which an image is displayed, and a non-display area NDA located around the display area DA. The display panel PNL includes a plurality of pixels PX in the display area DA. The pixels PX are arrayed in a matrix and arranged in the first direction X and the second direction Y.

For example, a length of an edge of the first substrate SUB1 parallel to the first direction X is approximately equal to a length of an edge of the second substrate SUB2 parallel to the first direction X. In addition, a length of an edge of the first substrate SUB1 parallel to the second direction Y is approximately equal to a length of an edge of the second substrate SUB2 parallel to the second direction Y. In other words, an area of the first substrate SUB1 parallel to the X-Y plane is approximately equal to an area of the second substrate SUB2 parallel to the X-Y plane. The X-Y plane is a plane defined by the first direction X and the second direction Y. In the embodiments, the edges of the first substrate SUB1 agree with the edges of the second substrate SUB2 in the third direction Z. In the embodiments, a length of the edge of the second substrate SUB2 parallel to the second direction Y may be smaller than a length of the edge of the first substrate SUB1 parallel to the second direction Y.

The wiring substrate 1 includes a core substrate 200, a driver IC chip 3 which drives the display panel PNL, and the like. The driver IC chip 3 is disposed on the core substrate 200. In the example illustrated, the wiring substrate 1 is disposed below the display panel PNL. In the example illustrated, the length of the edge of the wiring substrate 1 parallel to the first direction X is approximately equal to the length of the edge of the first substrate SUB1 and the second substrate SUB2 parallel to the first direction X, but may be approximately shorter than the length of the edge of the first substrate SUB1 and the second substrate SUB2 parallel to the first direction X. The wiring substrate 1 is adhered to the display panel PNL in the non-display area NDA. The display panel PNL and the wiring substrate 1 are electrically connected to each other. The flexible printed circuit 2 is disposed on the wiring substrate 1.

In the embodiments, the display device DSP includes a bend area BA as an area which is bent when the display device DSP is accommodated in the housing of the electronic device and the like. In the figure, hatch lines are drawn in the bend area BA. The bend area BA is bent such that the wiring substrate 1, the flexible printed circuit 2, and the driver IC chip 3 are disposed on the lower side of the display area DA. The bend area BA is located in the non-display area NDA.

Figure 2:
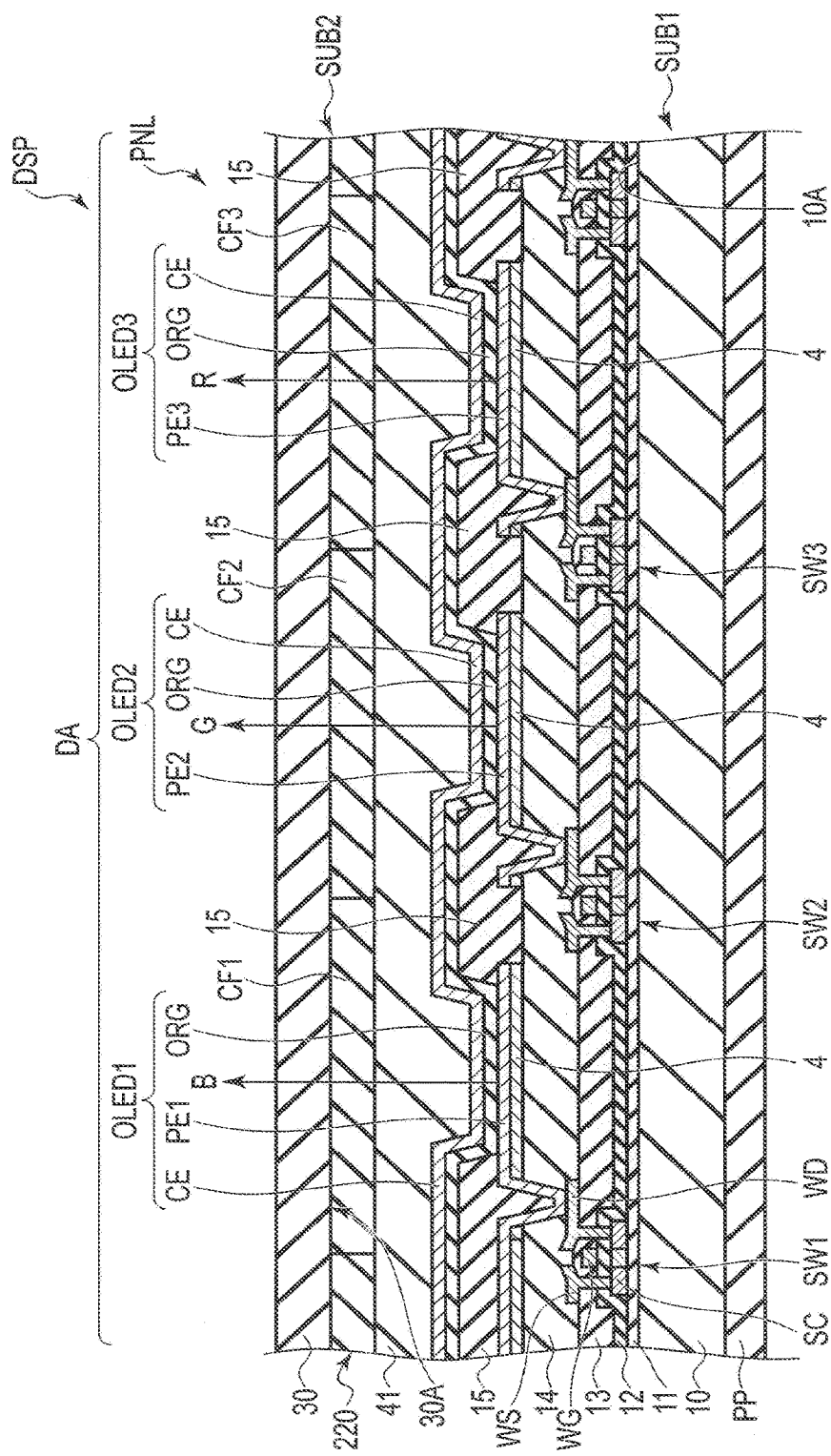
FIG. 2 is a cross-sectional view showing a display area of the display device shown in FIG. 1.

FIG. 2 is a cross-sectional view showing the display area DA of the display device DSP shown in FIG. 1.

As shown in FIG. 2, the first substrate SUB1 includes a first insulating substrate 10, switching elements SW1, SW2, and SW3, a reflective layer 4, organic EL elements OLED1, OLED2, and OLED3, a sealing layer 41, a protective member PP, and the like. The first insulating substrate 10 is formed of an organic insulating material, for example, polyimide. The first insulating substrate 10 is covered with a first insulating film 11.

The switching elements SW1, SW2, and SW3 are formed on the first insulating film 11. In the example illustrated, the switching elements SW1, SW2, and SW3 are composed of top-gate type thin-film transistors but may be composed of bottom-gate type thin-film transistors. Since the switching elements SW1, SW2, and SW3 have the same structures, the structure of the switching element SW1 will be specifically explained below in more detail. The switching element SW1 comprises a semiconductor layer SC formed on the first insulating film 11. The semiconductor layer SC is covered with a second insulating film 12. The second insulating film 12 is also disposed on the first insulating film 11.

A gate electrode WG of the switching element SW1 is formed on the second insulating film 12 and located directly above the semiconductor layer SC. The gate electrode WG is covered with a third insulating film 13. The third insulating film 13 is also disposed on the second insulating film 12.

The first insulating film 11, the second insulation film 12, and the third insulating film 13 are formed of, for example, an organic material such as a silicon oxide and a silicon nitride.

A source electrode WS and a drain electrode WD of the switching element SW1 are formed on the third insulating film 13. The source electrode WS and the drain electrode WD are electrically connected with the semiconductor layer SC through a contact hole which penetrates the second insulating film 12 and the third insulating film 13. The switching element SW1 is covered with a fourth insulating film 14. The fourth insulating film 14 is also disposed on the third insulating film 13. The fourth insulating film 14 is formed of, for example, an organic material such as a transparent resin.

The reflective layer 4 is formed on the fourth insulating film 14. The reflective layer 4 is formed of a metal material having a high reflectance such as aluminum or silver. The surface of the reflective layer 4 (i.e., the surface on the second substrate SUB2 side) may be a flat surface or an uneven surface to impart a light scattering property.

The organic EL elements OLED1 to OLED3 are formed on the fourth insulating film 14. In the example illustrated, the organic EL element OLED1 is electrically connected with the switching element SW1, the organic EL element OLED2 is electrically connected with the switching element SW2, and the organic EL element OLED3 is electrically connected with the switching element SW3. Each of the organic EL elements OLED1 to OLED3 is configured as a top emission type organic EL element which emits white light toward the second substrate SUB2 side. The organic EL elements OLED1 to OLED3 have the same structure.

The organic EL element OLED1 comprises a pixel electrode PE1 formed on the reflective layer 4. The pixel electrode PE1 is in contact with the drain electrode WD of the switching element SW1 and is electrically connected with the switching element SW1. Similarly, the organic EL element OLED2 comprises a pixel electrode PE2 electrically connected with the switching element SW2, the organic EL element OLED3 comprises a pixel electrode PE3 electrically connected with the switching element SW3. The pixel electrodes PE1, PE2, and PE3 are formed of, for example, a transparent conductive material such as Indium-Tin-Oxide (ITO) or Indium—Zinc-Oxide (IZO).

The organic EL elements OLED1 to OLED3 further comprise an organic emitting layer ORG and a common electrode CE. One of the pixel electrode PE and the common electrode CE is an anode, and the other electrode is a cathode. The organic emitting layer ORG is located on each of the pixel electrodes PE1 to PE3. The common electrode CE is located on the organic emitting layer ORG. The common electrode CE is formed of, for example, a transparent conductive material such as ITO or IZO. In the example illustrated, the organic EL elements OLED1 to OLED3 are sectioned by ribs 15. The organic EL elements OLED1 to OLED3 are, desirably, sealed by a transparent sealing film (not shown).

A sealing layer 41 covers upper parts of the organic EL elements OLED1, OLED2, and OLED3. The sealing layer 41 is formed to seal members disposed between the first insulating substrate 10 and the sealing layer 41. The sealing layer 41 suppresses entry of oxygen and moisture to the organic EL elements OLED1, OLED2, and OLED3 and also suppresses deterioration of the organic EL elements OLED1, OLED2, and OLED3. The sealing layer 41 may be formed of a stacked body of an organic film and an inorganic film.

The second substrate SUB2 includes a second insulating substrate 30, a color filter layer 220, and the like. The second insulating substrate 30 is disposed on the sealing layer 41. The second insulating substrate 30 may be, for example, a glass substrate, a resin substrate, or an optical element comprising an optical film, a polarizer and the like. The second insulating substrate 30 is, for example, adhered to the sealing layer 41 in the non-display area, which will be explained later.

A color filter layer 220 is disposed on an inner surface 30A side of the second insulating substrate 30. The color filter layer 220 includes a color filter CF1, a color filter CF2, and a color filter CF3. The color filters CF1, CF2, and CF3 are formed of resin materials in different colors. For example, the color filter CF1 is a blue color filter, the color filter CF2 is a green color filter, and the color filter CF3 is a red color filter. The color filter layer 220 may further include a white or transparent color filter. The color filters CF1, CF2, and CF3 are opposed to the organic EL elements OLED1, OLED2, and OLED3, respectively.

The protective member PP is disposed under the first substrate SUB1. In the example illustrated, the protective member PP is adhered to the lower side of the first insulating substrate 10 but the other thin film may be interposed between the protective member PP and the first insulating substrate 10. An inexpensive material excellent in heat resistance, gas barrier property, moisture resistance and strength is desirable as the material of the protective member PP. The protective member PP has heat resistance so as not to be deteriorated and deformed at a process temperature during a process of manufacturing the display device DSP. The protective member PP functions as a support layer which has a greater strength than the first insulating substrate 10 to suppress a situation in which the display panel PNL is curved in a state of receiving no stress from the outside. In addition, the protective member PP has a moisture resistance property of suppressing entry of moisture and the like into the first insulating substrate 10 and a gas barrier property of suppressing entry of gas, and functions as a barrier layer. In the embodiments, the protective member PP is, for example, a film formed with polyethylene terephthalate.

A metal layer may be formed below the protective member PP. The metal layer is, for example, a thin film evaporated onto the protective member PP, but the other thin film may be interposed between the protective member PP and the metal layer. A material more excellent in gas resistance than the protective member PP is preferable in a manufacturing process, as the material of the metal layer, and the metal layer is formed of, for example, aluminum or an aluminum alloy.

In this display device DSP, when the organic EL elements OLED1 to OLED3 emit light, the light (white light) is emitted to the outside through the color filters CF1, CF2, and CF3. At this time, light of a blue color wavelength, of white light emitted from the organic EL element OLED1, is transmitted through the color filter CF1. In addition, light of a green color wavelength, of white light emitted from the organic EL element OLED2, is transmitted through the color filter CF2. In addition, light of a red color wavelength, of white light emitted from the organic EL element OLED3, is transmitted through the color filter CF3. The color display is thereby implemented.

The pixel PX shown in FIG. 1 is, for example, a minimum unit to form a color image, and comprises the organic EL elements OLED1 to OLED3.

In the above configuration example, the organic EL elements OLED1 to OLED3 comprise the common organic emitting layer ORG but the configuration is not limited to this. For example, the organic EL element OLED1 may comprise an organic emitting layer emitting blue light, the organic EL element OLED2 may comprise an organic emitting layer emitting green light, and the organic EL element OLED3 may comprise an organic emitting layer emitting red light, and the color filter layer 220 may not be disposed in this configuration example.

FIG. 3 is a cross-sectional view showing the display device DSP shown in FIG. 1 including the non-display area NDA. Since the second substrate SUB2 has substantially the same structure as the structure of the second substrate SUB2 shown in FIG. 2, details of the structure are not explained here. In the embodiments, viewing the first substrate SUB1 from the second substrate SUB2 side is defined as a planar view.

The first insulating film 11 and the second insulating film 12 are assumed to be an inorganic insulating film II. The inorganic insulating film II covers the first insulating substrate 10. The inorganic insulating film II is composed of the first insulating film 11 and the second insulating film 12, and is not limited to these but can be variously modified. For example, the inorganic insulating film II may also be a single-layer insulating film or three or more insulating films.

The first insulating substrate 10 and the inorganic insulating film II do not extend to an edge portion SUB1E of the first substrate SUB1, but are cut in the middle, in the non-display area NDA. The display panel PNL includes a first area AR1 and a second area AR2 adjacent to the first area AR1. The first area AR1 corresponds to an area in which the first insulating substrate 10 and the inorganic insulating film II are disposed. The second area AR2 corresponds to an area in which the first insulating substrate 10 or the inorganic insulating film II is not disposed. An end surface 10E of the first insulating substrate 10 and an end surface IIE of the inorganic insulating film II are located above a boundary surface B between the first area AR1 and the second area AR2.

A pad PD is disposed in the second area AR2. In the example illustrated, the pad PD is formed by stacking electrodes P1 and P2. The electrode P1 is, for example, formed of the same material in the same process as the gate electrode WG shown in FIG. 2, and is formed with a molybdenum tungsten alloy. The electrode P1 is formed in, for example, an island-like shape. The electrode P2 is formed of, for example, a conductive material such as a metal material. In the example illustrated, the third insulating film 13 does not extend to the boundary surface B, but is cut in the middle, in the area AR1. In addition, the third insulating film 13 is disposed on a side of an edge portion SUB1E of the first substrate SUB1, in the second area AR2. In the second area AR2, several parts of the third insulating film 13 are disposed between the electrodes P1 and P2.

The signal line 6 is disposed on the third insulating film 13 and also disposed on the inorganic insulating film II, in the first area AR1. The signal line 6 is disposed continuously from the first area AR1 to the second area AR2 and is electrically connected with the pad PD. The signal line 6 and the pad PD may be formed separately or formed integrally. In the example illustrated, the signal line 6 is formed integrally with the electrode P2. The signal line 6 corresponds to the power supply line or various control lines. The signal line 6 is formed of, for example, a stacked layer body of titanium, aluminum, and titanium.

The signal line 6 and the pad PD may be disposed in the same layer of the other layers. The signal line 6 and the pad PD may be disposed in different layers and be electrically connected to each other through a contact hole formed in an interlayer insulating film formed between the signal line 6 and the pad PD.

The fourth insulating film 14 is disposed in the first area AR1 and the second area AR2. The fourth insulating film 14 covers the signal line 6, the pad PD, and the third insulating film 13. The fourth insulating film 14 is in contact with the signal line 6, and is located on the side opposite to the first insulating substrate 10 with respect to the signal line 6. The fourth insulating film 14 is an organic insulating film and is formed of an acrylic organic film or a polyimide-based organic film, in the embodiments.

The protective layer PR covers the signal line 6 disposed in the second area AR2. The protective layer PR is formed of, for example, an organic insulating material. The protective layer PR is disposed, and corrosion of the signal line 6 is thereby suppressed.

In the example illustrated, the first area AR1 includes the first insulating substrate 10, the inorganic insulating film II disposed on the first insulating substrate 10, and the signal line 6 disposed on the inorganic insulating film II. The second area AR2 includes the protective layer PR and the signal line 6 on the protective layer PR.

In the example illustrated, the color layer is not disposed in the non-display area NDA, and the second insulating substrate 30 is adhered to the sealing layer 41 in the non-display area NDA. In the example illustrated, the first substrate SUB1 further includes a spacer SP. The spacer SP is disposed on the fifth rib 15. The spacer SP is disposed on a side of the first substrate SUB1 opposed to the second substrate SUB2 and is formed to protrude toward the second substrate SUB2 side. The spacer SP is formed of, for example, a resin material containing an acrylic resin as its base. The spacer SP is located on the pad PD.

The single spacer SP may be shaped in a wall continuously extending in the first direction X. Alternatively, a plurality of spacers SP may be shaped in a discontinuous wall. Alternatively, a plurality of spacers SP may be shaped in scattered columns. The spacer SP is superposed on at least several parts of the pad PD in the third direction Z.

In the example illustrated, the spacer SP is formed in a forward tapered shape which is tapered toward the second substrate SUB2, and the shape of the spacer SP is not limited to the example illustrated but the spacer SP may be formed in an inverse tapered shape which is tapered toward the first substrate SUB1. In the example illustrated, the spacer SP is formed on the first substrate SUB1, but may be formed on the second substrate SUB2.

The spacer SP has a greater strength than a sealing layer 41. For this reason, the strength between the first substrate SUB1 and the second substrate SUB2 to the force in the third direction Z can be increased when the wiring substrate 1 is pressed against the display panel PNL.

The wiring substrate 1 is mounted on the second area AR2 via the pad PD from the lower side of the display panel PNL. In other words, the display panel PNL includes an exposure surface S on which the pads PD are exposed on the first insulating substrate 10 side and the side opposed to the end surface 10E of the first insulating substrate 10 from the signal lines 6, in the second area AR2, and the wiring substrate 1 is mounted on the exposure surface S. The wiring substrate 1 includes a core substrate 200, a connection line 100 disposed on an upper surface side of the core substrate 200, and a driver IC chip 3 disposed on the upper surface side of the core substrate 200. The driver IC chip 3 functions as a signal supply source which supplies a signal necessary to drive the display panel PNL, and the like. The position of the driver IC chip 3 is not particularly limited, but the driver IC chip 3 may be disposed on the lower surface side of the core substrate 200. The flexible printed circuit 2 is disposed on the upper surface side of the wiring substrate 1.

The display panel PNL and the wiring substrate 1 are electrically connected and adhered to each other via an anisotropic conductive film 5 formed of a conductive material. The anisotropic conductive film 8 contains conductive particles dispersed in an adhesive. For this reason, the wiring substrate 1 and the display panel PNL are pressed upwardly and downwardly in the third direction Z and heated in a state in which the anisotropic conductive film 5 is intervened between the wiring substrate 1 and the display panel PNL, and the wiring substrate 1 and the display panel PNL are thereby connected to each other electrically and physically. The anisotropic conductive film 8 is in contact with and electrically connected to the pad PD. In addition, the anisotropic conductive film 8 is in contact with and electrically connected to the connection line 100. The connection line 100 is thereby electrically connected with the pad PD and the signal line 6 via the anisotropic conductive film 8. The bend area BA as shown in FIG. 1 corresponds to an area between the boundary surface B and an end surface 1E of the wiring substrate 1 and is included in the second area AR2. The signal line 6 is exposed from an exposed surface S, in the bend area BA. The bend portion BA is bent, and pad PD is thereby disposed on the back surface side of the display panel PNL.

In the example illustrated, the second substrate SUB2 is disposed in the second area AR2 but may not be formed to suppress the stress when the bend area BA is bent.

Figure 4:
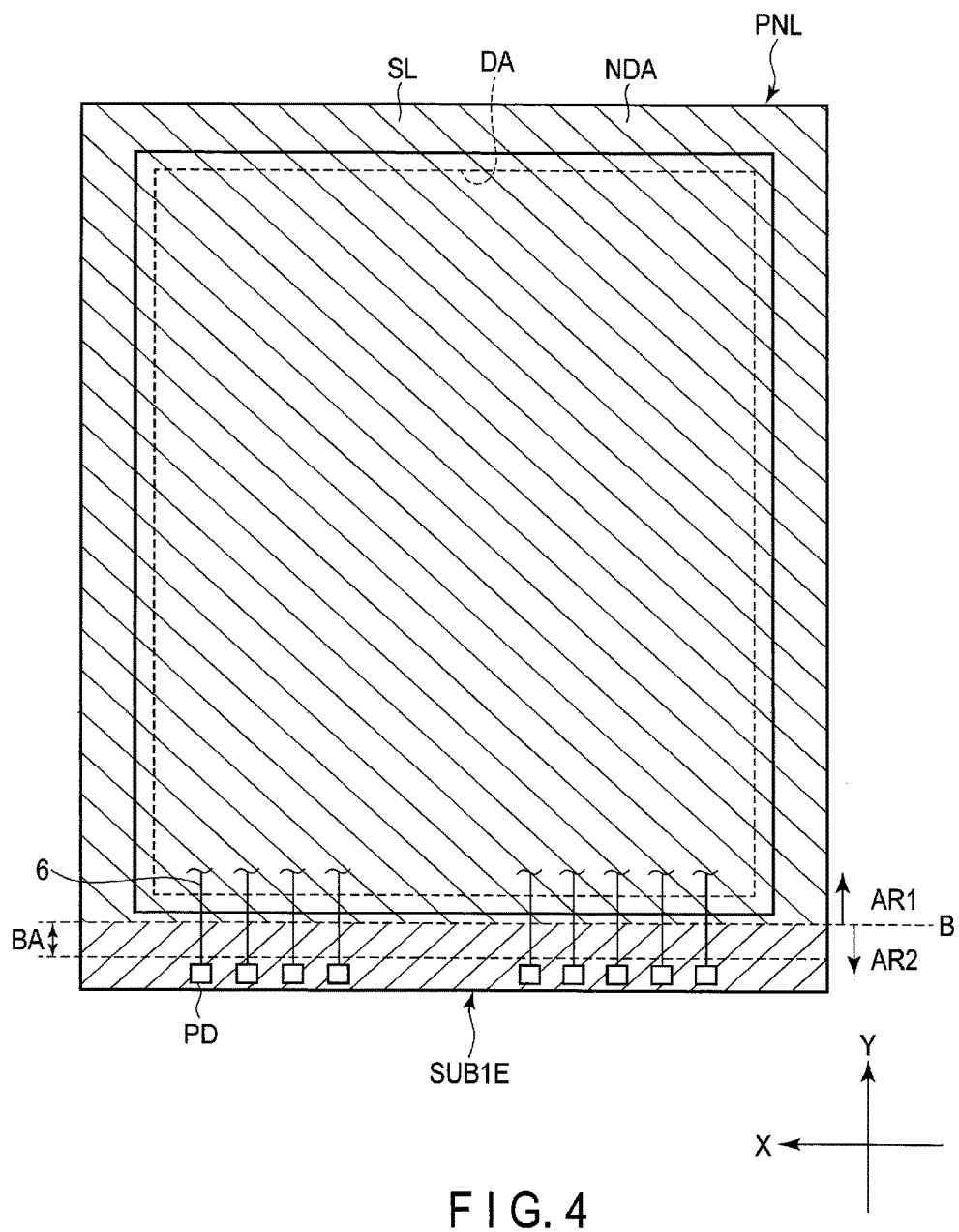

FIG. 4 is a plan view showing the display panel PNL according to the embodiments, illustrating a positional relationship between the first area AR1 and the second area AR2, and the like. In FIG. 4, the first area AR1 is represented by downward sloping hatch lines and the second area AR2 is represented by upward sloping hatch lines. The second area AR2 is adjacent to the first area AR1, and extends to the first direction X in the non-display area NDA on the side of the edge portion SUB1E of the first substrate SUB1.

As shown in FIG. 3, the first area AR1 corresponds to an area in which the first insulating substrate 10 and the inorganic insulating film II are disposed in planar view, and the second area AR2 corresponds to an area in which the first insulating substrate 10 or the inorganic insulating film II is not disposed in planar view. A plurality of pads PD are superposed on the second area AR2 and arranged in the first direction X, in planar view. The bend area BA is located between a boundary surface B and the pad PD. The signal lines 6 are connected to the pads PD, respectively, and extend in the second direction Y to be arranged in the first direction X in the bend area BA.

Next, a process of manufacturing the display device according to the embodiments will be explained with reference to FIG. 5 to FIG. 10. The structure of the upper layers from the pads PD in FIG. 5 to FIG. 10 is the same as the structure of the upper layers from the pads PD in the display panel PNL shown in FIG. 3.

Figure 5:
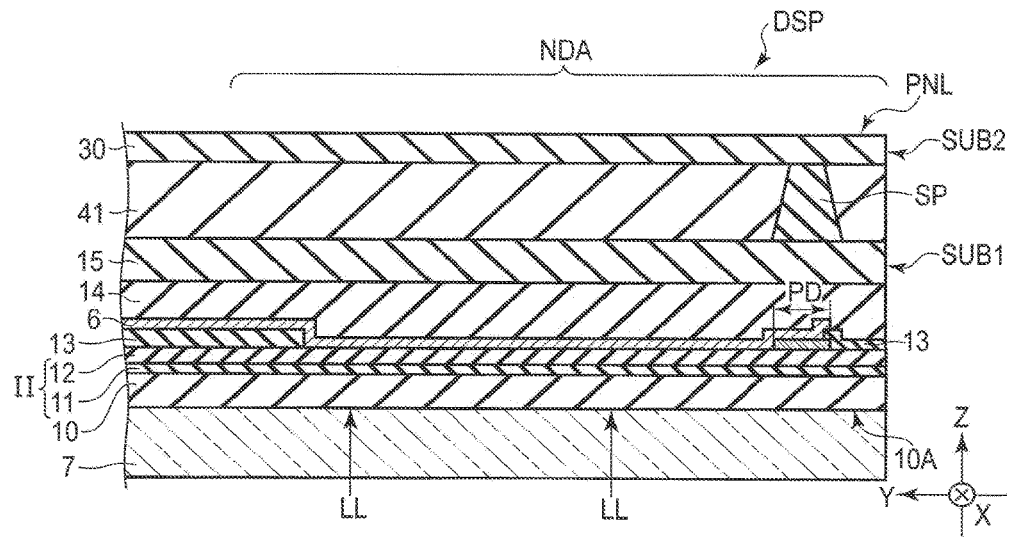
FIG. 5 is a cross-sectional view for explanation of a process of detaching a support substrate from a first insulating substrate.

FIG. 5 is a cross-sectional view for explanation of a process of detaching a support substrate 7 from the first insulating substrate 10. The members such as the first insulating substrate 10, the inorganic insulating film II, the pads PD and the signal lines 6 constituting the first substrate SUB1 are sequentially formed on the support substrate 7 and then the second substrate SUB2 is adhered to the first substrate SUB1.

After that, laser light LL is applied from the lower side of the support substrate 7 to detach the support substrate 7 from the first insulating substrate 10. In the embodiments, for example, the support substrate 7 is formed of glass, and the first insulating substrate 10 is formed of polyimide. When the laser light LL is applied from the back surface side of the support substrate 7, the laser light LL reaches a surface 10A of the first insulating substrate 10. In the first insulating substrate 10, ablation which urges the first insulating substrate 10 to absorb the laser light LL and to be decomposed occurs in an interface between the support substrate 7 and the first insulating substrate 10. Space is thereby generated between the support substrate 7 and the first insulating substrate 10, and the support substrate 7 is detached from the first insulating substrate 10.

Figure 6:
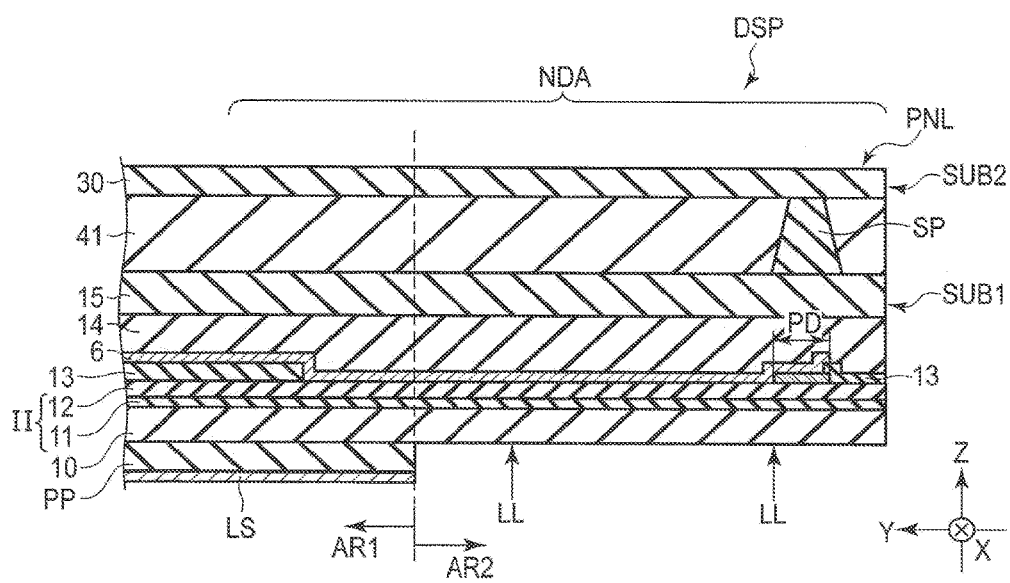
FIG. 6 is a cross-sectional view for explanation of a process of removing the first insulating substrate in a second area.

FIG. 6 is a cross-sectional view for explanation of a process of removing the first insulating substrate 10 in the second area AR2.

Next, the protective member PP is stuck to the first insulating substrate 10 by an adhesive sheet. More specifically, if the protective member PP is subjected to alignment and then heated in a state in which an adhesive sheet is disposed between the first insulating substrate 10 and the protective member PP, the protective member PP is stuck to the lower side of the first insulating substrate 10. Since the protective member PP is thus heated after being subjected to alignment, displacement can be suppressed.

Next, a light shield mask LS which blocks the laser light LL is disposed on the first area AR1, and the laser light LL is applied from the lower side of the first substrate SUB1. Since the light shield mask LS is disposed in the first area AR1, the laser light LL does not reach the first insulating substrate 10. In the second area AR2, the first insulating substrate 10 absorbs the laser light LL, is decomposed and removed.

At this time, the laser light LL to remove the first insulating substrate 10 in the second area AR2 is laser light having a wavelength shorter than 355nm, in the embodiments. More specifically, for example, the wavelength of the laser light LL ranges from approximately 248to 355nm. The absorptivity of the laser light having a wavelength shorter than 355nm in the first insulating substrate 10 is larger than the absorptivity of the laser light having a wavelength shorter than 355nm in the inorganic insulating film II.

In the embodiments, for example, the fourth insulating film 14 is formed of an acrylic organic film or a polyimide-based organic film. In this case, ablation hardly occurs in the fourth insulating film 14 even if the laser light LL is transmitted above the inorganic insulating film II and is applied to an area which is not superposed on the signal lines 6 of the fourth insulating film 14.

Figure 7:
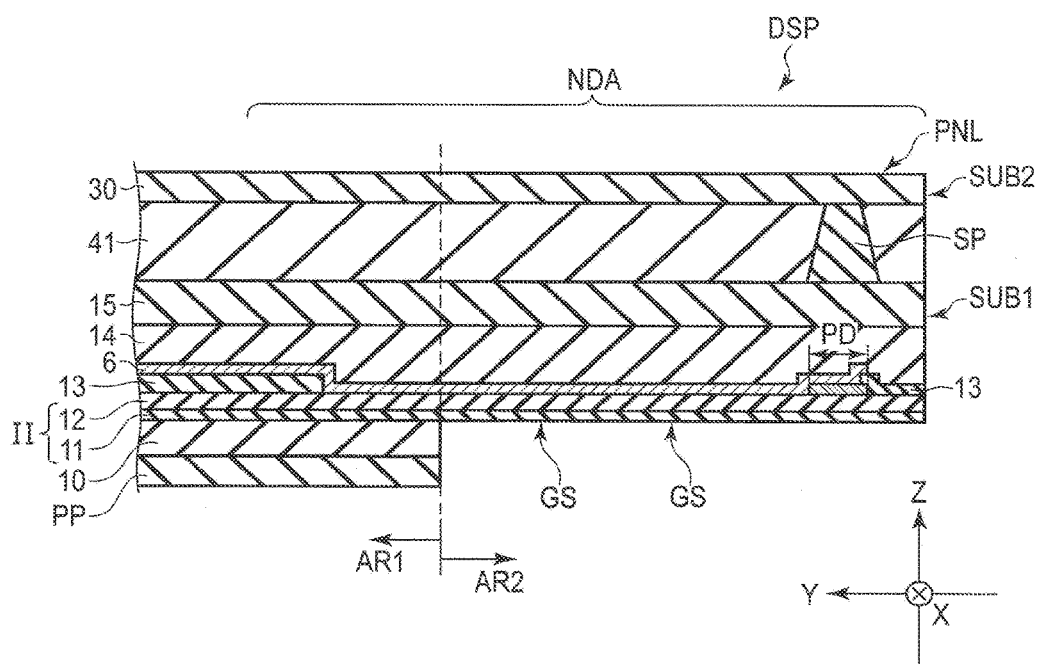
FIG. 7 is a cross-sectional view for explanation of a process of removing an inorganic insulating film in the second area.

FIG. 7 is a cross-sectional view for explanation of a process of removing the inorganic insulating film II in the second area AR2.

Next, the inorganic insulating film II is removed by ashing, in the second area AR2. The inorganic insulating film II is not removed in the first area AR1 since the film is covered with the protective member PP. The gas used for ashing is, for example, sulfur hexafluoride (SF6).

At this time, the protective member PP functions as a mask which prevents the first area AR1 from being cut by ashing. Furthermore, if a metal layer is formed under the protective layer PP, cutting of the protective member PP in the ashing and degradation in performance (heat resistance, gas barrier, moisture resistance, strength and the like) required for the protective member PP can be suppressed since the metal layer has a property of resistance to gas of aching.

FIG. 8 is a cross-sectional view for explanation of a process of crimping the wiring substrate 1 on the display panel PNL.

After the first insulating substrate 10 and the inorganic insulating film II are removed, the end surface IIE of the inorganic insulating film II is located just above the end surface 10E of the first insulating substrate 10 as shown in FIG. 8. The end surface IIE of the inorganic insulating film II is located on the same plane as the boundary surface B between the first area AR1 and the second area AR2. The end surface 10E of the first insulating substrate 10 is located just above the end surface PPE of the protective member PP. The end surface PPE of the protective member PP is located on the same plane as the boundary surface B. In addition, the signal line 6 is exposed from the exposure surface S of the display panel PNL. As explained above, the signal line 6 is composed of, for example, a stacked layer body of titanium, aluminum, and titanium and, at this time, the titanium layer of the signal line 6 is exposed to the lower side of the display panel PNL.

Next, the process of pressing the wiring substrate 1 against the display panel PNL is executed with the anisotropic conductive film 8. The anisotropic conductive film 8 is disposed at a position between the wiring substrate 1 and the display panel PNL, which is superposed on the pad PD, and pressed from the lower side of the wiring substrate 1 and the upper side of the display panel PNL in directions represented by arrows in FIG. 8, and heated. Thus, the anisotropic conductive film 8 is molten, conductive particles contained in the anisotropic conductive film 8 contact the pad PD, and the wiring substrate 1 and the display panel PNL are connected electrically and physically.

In the above process, the wiring substrate 1 is pressed against the display panel PNL.

FIG. 9 is a cross-sectional view for explanation of a process of bending the bend portion BA of the display panel PNL.

First, the protective layer PR is disposed at the bend portion BA to cover the exposed signal line 6. The protective layer PR is disposed in the second area AR2. The protective layer PR is formed of, for example, an organic insulating material and is formed by being cured by UV irradiation. In addition, the signal line 6 is disposed on the protective layer PR and sandwiched between the fourth insulating film 14 formed of an organic insulating film and the protective layer PR in the second area AR2. For this reason, when the bend area BA is bent, the signal line 6 is located on a plane approximately equal to a neutral plane between the fourth insulating film 14 and the protective layer PR.

Next, the position of the pedestal portion 5 is aligned, and the pedestal portion 5 is adhered to the first area AR1 by an adhesive layer AD1. After that, the bend portion BA of the display panel PNL is bent such that the pad PD is disposed under the display panel PNL. In other words, the wiring substrate 1 is turned about the pedestal portion 5 to be disposed under the pedestal portion 5, and is stuck to the pedestal portion 5 in the adhesive layer AD2. In the embodiments, a thickness W of the display panel PNL at the bend portion BA is, for example, approximately 130μm. In addition, the pedestal portion 5 is formed in, for example, a sheet shape.

FIG. 10 is a cross-sectional view showing a bent state of the bend portion BA of the display panel PNL shown in FIG. 9.

The bend area BA is bent such that the first area AR1 of the display panel PNL and the wiring substrate 1 are opposed to each other. In the present embodiment, a radius of curvature can be set at 1.0mm or less and, for example, the radius of curvature of the bend area BA is approximately 0.3mm. The pedestal portion 5 is disposed between the first area AR1 and the wiring substrate 1. Even if a stress on the display panel PNL or the wiring substrate 1 from the pedestal portion 5 is generated when impulse is applied from the outside, the display panel PNL and the wiring substrate 1 can hardly be damaged by disposing the pedestal portion 5. In addition, adhesion between the first area AR1 and the wiring substrate 1 is improved by disposing the pedestal portion 5.

The adhesive layer AD1 is disposed between the wiring substrate 1 and the pedestal portion 5 to adhere the wiring substrate 1 and the pedestal portion 5. The adhesive layer AD2 is disposed between the wiring substrate 1 and the pedestal portion 5 to adhere the wiring substrate 1 and the pedestal portion 5. The adhesive layers AD1 and AD2 may be formed to be connected as shown in the figure or may be formed separately. Each of the adhesive layers AD1 and AD2 is, for example, a double-faced tape. The protective layer PR is chiefly disposed between the bend portion BA and the pedestal portion 5. The pedestal portion may not be disposed and, in this case, the bent portion is hollow but may remain hollow or filled with the adhesives AD1 and AD2 and the like.

In the embodiments, the inorganic insulating film II is not disposed under the signal line 6, in the second area AR2. For this reason, cutting of the signal line 6 caused by applying a bending stress to the inorganic insulating film II and generating crack can be suppressed when the bend region BA is bent. For this reason, the reduction in manufacturing yield can be suppressed.

In addition, as shown in FIG. 3, the wiring substrate 1 is disposed below the display panel PNL. For this reason, the first insulating substrate 10 can be removed in the second area AR2, and the inorganic insulating film II can be removed from the lower side of the display panel PNL by ashing. For example, if the inorganic insulating film II is removed from the upper side of the display panel PNL by ashing without removing the first insulating substrate 10, the signal line 6 may serve as a mask and the inorganic insulating film II under the signal line 6 may not be removed, but the inorganic insulating film II can be removed at the position superposed on the signal line 6 by employing the above-explained configuration.

An electronic device and the like accommodating the display panel PNL can be narrowed or downsized by bending the bend portion BA of the display panel PNL as explained above. In addition, an accommodation volume can be reduced by reducing the width of the non-display area NDA.

As described above, the display device capable of suppressing the reduction in manufacturing yield can be provided by the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments can be applied to not only organic electroluminescent display device, but also a liquid crystal display device. In this case, the display panel PNL is, for example, a liquid crystal display panel comprising a liquid crystal layer sandwiched between the first substrate SUB1 and the second substrate SUB2. If the display panel PNL is a liquid crystal display panel, the liquid crystal display panel may be a reflective liquid crystal display panel which displays an image by selectively reflecting light incident from the second substrate SUB2 side or a transmissive liquid crystal display panel which displays an image by urging the light incident from the first substrate SUB1 side to be selectively transmitted. A reflective liquid crystal display device may be preferable if the display area DA and the wiring substrate 1 are superposed in planar view, but a transmissive liquid crystal display device may also be employed if a backlight unit can be disposed between the first substrate SUB1 and the wiring substrate 1. The major constituent elements concerning the embodiments are substantially the same even if the display device DSP is a liquid crystal display device.

What is claimed is:

1. A display device comprising:
a display panel including a first area comprising a display area and a second area adjacent to the first area, the display panel comprising
an insulating substrate,
an inorganic insulating film disposed on the insulating substrate,
a signal line disposed on the inorganic insulating film, and
a pad electrically connected with the signal line; and
a wiring substrate connected to the pad of the display panel, wherein
the insulating substrate and the inorganic insulating film are not provided in the second area,
the signal line is covered by a protective layer in the second area, and directly contacts the protective layer, and
the wiring substrate connects to the pad on an opposite surface to a display surface of the display area.

2. The display device of claim 1, wherein
absorptivity of laser light having a wavelength shorter than 355 nm in the insulating substrate is larger than absorptivity of laser light having a wavelength shorter than 355 nm in the inorganic insulating film.

3. The display device of claim 1, wherein
an end surface of the inorganic insulating film is located just above an end surface of the insulating substrate.

4. The display device of claim 1, wherein
an end surface of the inorganic insulating film is located on a same plane as a boundary surface between the first area and the second area.

5. The display device of claim 1, wherein
the inorganic insulating film includes a first inorganic insulating film and a second inorganic insulating film stacked on the first inorganic insulating film.

6. The display device of claim 1, further comprising:
an organic insulating film disposed on the signal line, wherein
the organic insulating film is disposed continuously from the first area to the second area, and
the organic insulating film is an acrylic organic film or a polyimide-based organic film.

7. The display device of claim 6, wherein
the signal line is sandwiched between the organic insulating film and the protective layer in the second area.

8. The display device of claim 1, wherein
the second area is bent such that the first area and the wiring substrate are opposed to each other.

9. The display device of claim 8, further comprising:
a pedestal portion; and an adhesive layer,
wherein
the pedestal portion is disposed between the first area and the wiring substrate, and the adhesive layer is disposed between the wiring substrate and the pedestal portion and between the first area and the pedestal portion.

10. The display device of claim 1, further comprising:
a protective member located under the insulating substrate, in the first area.

11. The display device of claim 10, wherein
an end surface of the insulating substrate is located just above an end surface of the protective member.

12. The display device of claim 10, wherein
the protective member is formed of polyethylene terephthalate.

13. The display device of claim 10, wherein
an end surface of the protective member is located on a same plane as a boundary surface between the first area and the second area.

* * * * *